Sept. 28, 1965 R. J. MARING 3,209,154

LIGHT RESPONSIVE SYSTEM INCLUDING LOAD CIRCUIT
WITH SOLID STATE SWITCH
Filed April 9, 1962

INVENTOR.
ROBERT J. MARING
BY Price & Heneveld
ATTORNEYS

United States Patent Office 3,209,154

Patented Sept. 28, 1965

3,209,154

LIGHT RESPONSIVE SYSTEM INCLUDING LOAD CIRCUIT WITH SOLID STATE SWITCH

Robert J. Maring, Grand Rapids, Mich., assignor, by mesne assignments, to the United States of America as represented by the Administrator of the Federal Aviation Agency Filed Apr. 9, 1962, Ser. No. 186,121
6 Claims. (Cl. 250—214)

This invention relates to a solid-state light responsive system and more particularly to a system comprising a novel combination of a light responsive photocell circuit and a solid-state controlled load circuit responsive to the signal generated by the photocell circuit.

Many light responsive systems have been devised but to my knowledge none have been completely satisfactory from both a production and operating standpoint. Such systems have been constructed of photoconductive tubes which have long time constants or are subject to malfunction and breakage under stress and strains generally encountered in their many uses. Other systems have attempted to utilize solid state components but with little success because of their narrow operating ranges and low sensitivities of their photocells. Systems of this type encounter many different ambient conditions, among these being temperature changes, which because of the low sensitivity of the photocells necessitates complicated and expensive temperature compensating means. In fact, such temperature compensating means are not always completely reliable.

According to this invention, I provide a novel combination of a highly sensitive photocell circuit and a load circuit having a solid state switch directly connected to the photocell without any intervening amplifying components.

This combination includes a photocell circuit including a p-n junction photoelectric cell of the type generally used for generating current in response to light. A source of negative bias is combined with this cell to cause it to operate in the reverse voltage direction whereby its operating range is increased from tenths to units and as a result its sensitivity is greatly increased. The load circuit forming an essential part of this invention includes a semiconductor controlled rectifier which generally is incapable of use with the photocell in the operating range because of the relatively high signal voltage required but which in the novel combination is accurately responsive despite changes in ambient conditions such as temperature.

Therefore, an object of this invention is to provide such a novel light responsive system which is relatively uncomplicated and inexpensive, which utilizes a minimum of solid-state components which are simple and uncomplicated, and which is capable of operating reliably under all ambient conditions and over long periods of time with little or no maintenance.

Other objects will become obvious upon reading the following disclosure which includes the appended drawings wherein.

Figure 1:
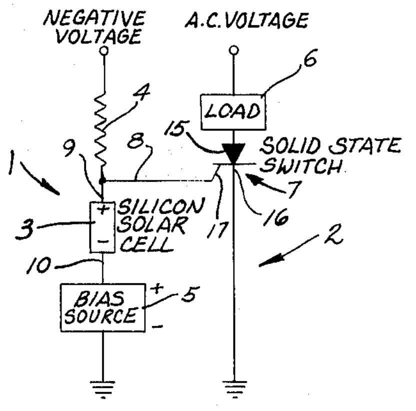
FIG. 1 is a block circuit diagram of the system of this invention.

Referring to the drawings, FIG. 1 discloses a photocell control circuit 1 and a load circuit 2 which is controlled by the photocell circuit. The photocell circuit includes a silicon solar cell connected in series with a load resistor 4 and a bias source 5. A source of negative voltage is applied to the anode of the solar cell for a purpose as described hereinafter.

The load circuit 2 includes a load 6 connected in series with a semi-conductor or solid state switch 7 across a A.C. voltage supply. The load circuit 2 is connected to the photocell circuit by a line 8 so that the photocell circuit controls the operation of the load circuit as will be described. Briefly then, light impinged or falling on the photocell 3 causes the solid state switch 7 to conduct operating the load. This is accomplished without the necessity of intervening amplifying components.

In accordance with the specific aspects of this invention the photocell 3 is a silicon p-n junction type photocell which is generally used to convert light energy directly into electric energy. A silicon cell of this type is capable of producing a photovoltaic voltage at its output terminals in addition to undergoing a change in resistance as the light input is varied. A silicon cell of this type is more generally referred to as a "solar cell" and is utilized in satellites and the like for generating the necessary power for such current consuming devices as radios and instruments. This cell 3 includes a so-called anode 9 and cathode 10. The load resistor 4 and source of negative voltage is connected to the anode side of the cell 3.

Figure 4:
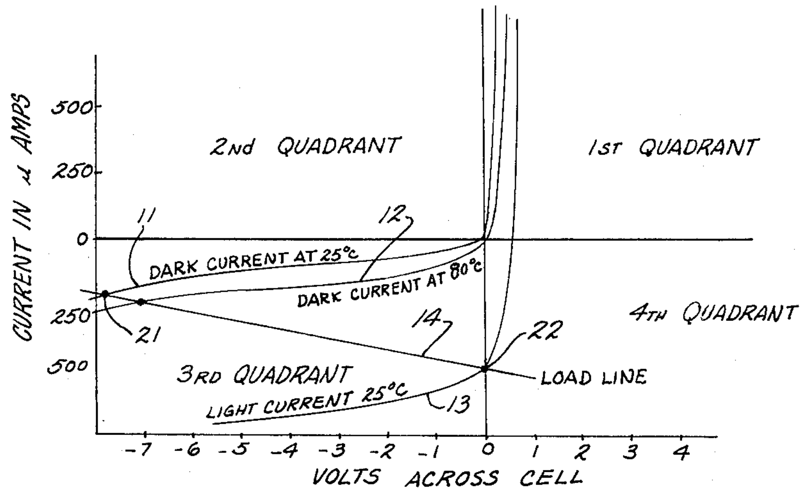
FIG. 4 is a graph of the characteristic curves of the photocell circuit of this invention.

The characteristic curves for the photocell 3 and resistor 4 are shown in FIG. 4. It will be noted the curves are extremely steep in the first and fourth quadrants but in the third quadrant the curve flattens out to a substantially horizontal position. The third quadrant, as is well known, represents the characteristics when a negative bias, or so-called reverse current, is applied to the anode 9 of the cell 3. Curve 11 designated "Dark Current at 25° C." represents the current-voltage characteristic with no light on the cell surface at a temperature of 25° C. Curve 12 represents the characteristic with no light but at 80° C. Curve 13 represents the current-voltage characteristic with light applied to the cell and at 25° C. The load line 14 is a typical desired load line determined by selecting a load resistor 4 having a certain resistance. It will be noted that the value of resistor 4 is chosen to make the load line 14 intersect the curve 13 near the zero voltage line and to intersect curves 11 and 12 at a voltage below breakdown. The value of negative voltage selected for operation of the circuit is generally midway between these voltages; for example, 3 to 4 volts in this specific embodiment.

FIG. 4 vividly illustrates the wide operating range of the photocell circuit, which even considering a change in temperature from 25° C. to 80° C., is seven volts. This wide operating range, contrasted with the small or narrow operating range of the circuit in the first and fourth quadrants contributes to the desired results obtained by this invention.

Figure 2:
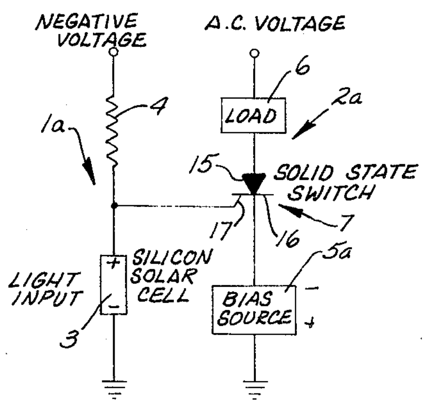
FIG. 2 is also a block circuit diagram of the system of this invention but slightly different than FIG. 1.

It should be understood that the photocell circuit 1 is to control the load circuit 2 so that when at a certain quantum of light, say for example a level of 40 foot candles, falls on the cell it will cause energization of the load 6. In accordance with the narrow aspects of this invention, my photocell circuit operates between zero voltage and a selected voltage below breakdown voltage. As a result the anode terminal of the cell, without any other means, would always be negative and incapable of making the solid state switch 7 conductive. Therefore, I provide the bias source 5 which causes the solid state switch 7 to be turned on. This bias source 5 can be located in series with photocell 3 such as shown in FIG. 1, or its polarity can be reversed and it can be located in the leg of the load circuit 2*a* as shown in 5*a* in FIG. 2. In the embodiment of FIG. 2, photocell circuit 1*a* does not have a bias source.

Figure 5:
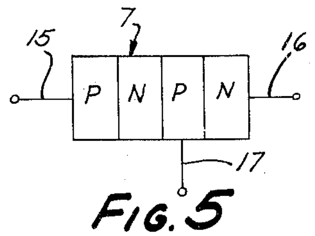
FIG. 5 is a diagrammatic illustration of the control rectifier forming a part of the load circuit of this invention.

The solid state switch 7, preferably utilized in accordance with a narrow aspect of this invention, is a silicon controlled rectifier having an anode or emitter electrode 15, a cathode or collector electrode 16 and a gating or control electrode 17. This silicon rectifier includes four zones of p-n-p-n conductivities as illustrated by FIG. 5. The operating characteristics of this type of silicon controlled rectifiers or so-called gated silicon rectifiers are such that the rectifier is rendered conductive solely by applying a sufficiently large potential across the anode electrode 15 and cathode electrode 16; or by the combined effect of an anode-cathode potential, which alone is insufficient to cause conduction, and a current of sufficient amplitude applied to the gating or control electrode. I preferably make the potential across the gate electrode 17 and cathode electrode 16 a positive 2 volts by reason of the bias source 5 or 5*a* and apply a current to the gating electrode as will be evident from the curve 13 of FIG. 4. This renders the rectifier 7 conductive and energizes the load 6.

Figure 3:
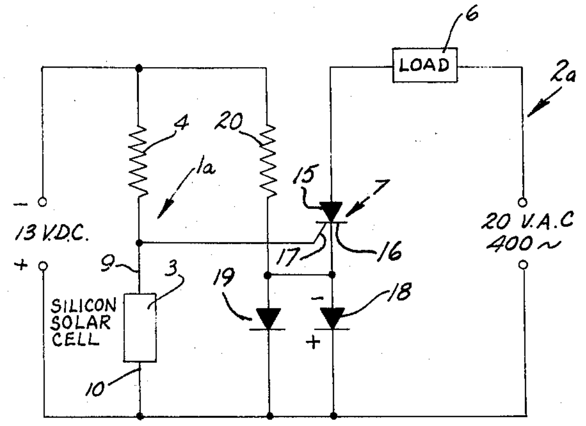
FIG. 3 is a more detailed circuit diagram of the circuit of FIG. 2.

FIG. 3 shows a more specific and detailed circuit diagram of the system shown by FIG. 2. It includes the photocell circuit 1 having a load resistor connected in series with the silicon solar cell 3, this circuit being negative biased by the 13 volt D.C. potential source disclosed. The load circuit 2*a* includes the silicon controlled rectifier 7 connected in series with a load 6 and a Zener diode 18 which establishes a bias source. A conventional semiconductor diode 19 is provided to create a low impedance across the Zener diode to protect it during load conduction.

As is well known, a Zener diode is a specific type of diode which permits current to flow in the reverse direction (from + to −). It has a specific breakdown voltage and the curve after breakdown is relatively constant. Therefore Zener diodes are designed to operate and be used in the breakdown portion of the curve. Zener diodes are thus used for a voltage reference or a voltage regulator.

In accordance with this invention the Zener diode 18 is connected in series with the 13 volt D.C. negative bias source and the resistor 20, the resistance of which is selected to establish the desired negative bias applied to the rectifier 7. As a result a selected voltage, for example 2 volts, is established and maintained across the diode 18 thus providing the bias source shown in FIG. 2. Zener diodes are not normally designed to carry a large forward current, thus diode 19 is provided to bypass diode 18 while the load conductance is taking place.

*Operation*

Having described the components of this system, its operation should be evident. However, a brief description will be made by reference to FIG. 3.

When the photocell 3 is dark, the 13 volt D.C. source in combination with resistor 4 (FIG. 3) establish a −8 volts (point 21, FIG. 4) across the photocell. Also resistor 20 and Zener diode 18 establish −2 volts across Zener diode 18. As a result the gate 17 of the rectifier 7 is at −6 volts with respect to the cathode 16 of the rectifier 7. Since the rectifier 7 requires approximately +1 volts gate to cathode for conduction, it would be nonconducting.

When light is impinged on the photocell 3, the voltage across the photocell 3 changes to zero (point 22, FIG. 4). As a result the gate is +2 volts with respect to the cathode and the rectifier 7 begins to conduct. During load conduction the load current bypasses diode 18 and flows through the lower impedance path created by diode 19.

It should be evident that in this operation a change in temperature causing displacement of the voltage current characteristic curve 11 to curve 12 (FIG. 4) has little effect upon the operation of the system. Further it should be evident that I have provided an uncomplicated system by which the photocell is connected directly to a solid state switch without intervening amplifying components. Also it should be obvious that I have provided a light responsive system of greatly increased sensitivity whereby response of the load circuit to light illumination is more accurate and less affected by ambient conditions such as temperature.

Within the broader aspects of this invention, it should be obvious that the voltage source for the load circuit could also be D.C., if a transistor or a silicon controlled rectifier of the type capable of being turned off with the gate were used for the solid state switch. In this case the turn off of load current as well as the turn on is controlled by the light not impinging or impinging on the photocell respectively.

Having described my invention, it should be understood that although I have shown preferred embodiments thereof, other embodiments and modifications can be made without departing from the spirit and scope of this invention unless the appended claims expressly state otherwise.

I claim:

1. A light responsive system comprising: a photocell circuit including a p-n junction silicon photoelectric cell characterized by generating current in response to light falling thereon and having characteristic curves falling in the first, third and fourth quadrants, a substantial portion of said curves in the third quadrant being relatively flat, a load circuit including a load connected in series with a p-n-p-n silicon controlled rectifier having an anode electrode, a cathode electrode and a gating electrode; said gating electrode of said rectifier being connected to the anode of said cell; and a source of negative biasing voltage applied to the anode of said cell causing said cell to operate substantially entirely in the third quadrant.

2. A light responsive system comprising: a photocell circuit including load resistor connected in series with a p-n junction photoelectric cell characterized by generating curent in response to light falling thereon and having characteristic curves falling in the first, third and fourth quadrants, a substantial portion of said curves in the third quadrant being relatively flat; said load resistor having a value with respect to said cell whereby its load line intersects the useful characteristic curves at substantially zero voltage and before the breakdown voltage; a load circuit including a load connected in series with a semi-conductor switch; said semi-conductor switch being connected to the anode of said cell; a source of negative biasing voltage applied to the anode of said cell causing said cell to operate substantially entirely in the third quadrant; and a source of bias voltage applied to the semi-conductor switch for rendering said switch conductive when the voltage across the cell is zero.

3. The system of claim 2 in which a Zener diode is connected in series with both the source of negative biasing voltage and the semi-conductor switch thereby forming the said source of bias voltage applied to the semi-conductor switch.

4. A light responsive system comprising: a photocell circuit including a silicon solar cell diode characterized by generating current in response to light falling thereon and exhibiting a substantially horizontal flat current curve in the reverse voltage direction; a load circuit including a load connected in series with a p-n-p-n silicon controlled rectifier having an emitter electrode, a collector electrode and a gating electrode; said cell having an anode connected to the gating electrode of said rectifier; and a source of negative biasing voltage applied to the anode of said cell causing said solar cell to operate only in the reverse voltage direction.

5. A light responsive system comprising: a photocell circuit including a load resistor connected in series with a solar cell characterized by generating curent in response to light falling thereon and exhibiting a substantially horizontal flat current curve in the reverse voltage direction; said load resistor having a value with respect to said cell whereby its load line intersects the useful characteristic curves at substantially zero voltage and before the breakdown voltage; a load circuit including a load connected in series with a semiconductor controlled rectifier having an anode, a cathode, and gating electrode; said cell having an anode connected to the gating electrode of said rectifier; a source of negative biasing voltage applied to the anode of said cell causing said solar cell to operate only in the reverse voltage direction; and a source of bias voltage applied to the rectifier for rendering said rectifier conductive when the voltage across the cell is zero.

6. The system of claim 5 in which a Zener diode is connected in series with both the source of negative biasing voltage and the rectifier thereby forming the said source of bias voltage applied to the rectifier.

References Cited by the Examiner

UNITED STATES PATENTS

| | | | |
|---|---|---|---|
| 2,779,877 | 1/57 | Lehovec | 250—211 |
| 2,780,765 | 2/57 | Chapin et al. | 250—211 X |
| 2,846,592 | 8/58 | Rutz | 250—211 |
| 2,863,056 | 12/58 | Pankove | 250—211 X |
| 2,993,998 | 7/61 | Lehovec | 250—211 |
| 3,002,100 | 9/61 | Rutz | 250—211 |
| 3,125,693 | 3/64 | De Clue | 307—88.5 |

OTHER REFERENCES

Akmenhalns et al.: "Optically Controlled Latch Circuit," IBM Technical Disclosure Bulletin, vol. 3, No. 3, August 1960, page 38.

Bryson: "Solar Cell Push Pull Amplifier," IBM Technical Disclosure Bulletin, vol. 4, No. 2, July 1961, pp. 50 and 51.

RALPH G. NILSON, *Primary Examiner.*

ARCHIE BORCHELT, *Examiner.*